(12) United States Patent
Chang et al.

(10) Patent No.: US 10,600,450 B2
(45) Date of Patent: Mar. 24, 2020

(54) RECEIVING MECHANISM AND HOLDER THEREOF

(71) Applicant: CHENBRO MICOM CO., LTD., New Taipei (TW)

(72) Inventors: Yun-Hsiang Chang, New Taipei (TW); Wei-Ting Lu, New Taipei (TW); Tung-Yang Hu, New Taipei (TW)

(73) Assignee: CHENBRO MICOM CO., LTD., New Taipei (TW)

( * ) Notice: Subject to any disclaimer, the term of this patent is extended or adjusted under 35 U.S.C. 154(b) by 0 days.

(21) Appl. No.: 16/387,551

(22) Filed: Apr. 18, 2019

(65) Prior Publication Data

US 2019/0325917 A1 Oct. 24, 2019

(30) Foreign Application Priority Data

Apr. 18, 2018 (TW) .............................. 107205074 A

(51) Int. Cl.
*H05K 5/00* (2006.01)
*G11B 33/12* (2006.01)
*G06F 1/18* (2006.01)

(52) U.S. Cl.
CPC ............ *G11B 33/124* (2013.01); *G06F 1/187* (2013.01); *G11B 33/128* (2013.01)

(58) Field of Classification Search
CPC ...................................................... H05K 7/00
See application file for complete search history.

(56) References Cited

U.S. PATENT DOCUMENTS

| 7,559,782 | B2 | 7/2009 | Yuh | |
|---|---|---|---|---|
| 8,743,536 | B2* | 6/2014 | Alo ...................... | H05K 5/0282 |
| | | | | 361/679.33 |
| 2015/0009619 | A1 | 1/2015 | Yin et al. | |
| 2017/0188478 | A1* | 6/2017 | Wang .................... | H05K 7/1402 |
| 2018/0146569 | A1* | 5/2018 | Schroeder ............ | G11B 33/027 |

FOREIGN PATENT DOCUMENTS

| TW | 435934 U | 5/2001 |
|---|---|---|
| TW | M327051 U | 2/2008 |
| TW | 201445562 A | 12/2014 |
| TW | 201531204 A | 8/2015 |
| TW | M522487 U | 5/2016 |

* cited by examiner

*Primary Examiner* — Jerry Wu
(74) *Attorney, Agent, or Firm* — CKC & Partners Co., LLC

(57) ABSTRACT

A holder includes a bracket, a first side portion, two second side portions and a third side portion. The bracket includes a support arm and an elastic plate inclinedly connected to the support arm. The first side portion is connected to one end of the support arm, and located at one side of the bracket. The second side portions are respectively connected to two opposite sides of the support arm, and collectively located at the side of the bracket. The third side portion is connected to one end of the elastic plate opposite to the support arm, and located at the same side of the bracket with the second side portions. When the elastic plate is pressed to be flush with the support arm, the bracket, the first side portion, the second side portions and the third side portion collectively form a holding space for holding a loaded object.

18 Claims, 9 Drawing Sheets

RECEIVING MECHANISM AND HOLDER THEREOF

RELATED APPLICATIONS

This application claims priority to Taiwan Application Serial Number 107205074, filed Apr. 18, 2018, which is herein incorporated by reference.

BACKGROUND

Field of Disclosure

The disclosure relates to a receiving mechanism and a holder thereof. More particularly, the disclosure relates to a receiving mechanism and a holder thereof for holding a loaded object.

Description of Related Art

At present, a server rack is loaded with a plurality of data access devices such as a magnetic disk, a hard disk or an optical disc etc. for storing a large amount of data so as to expand or enhance the capability of the server. The data access devices respectively are replaceable on the server rack for the user to hot swap any of the data access devices.

However, after a cover panel installed in front of the server rack is opened, if a part of the cover panel is still on a traveling path of the data access device, the action that the data access device being pulled out of the server rack may be slowed down or hindered, thereby causing inconvenience and trouble.

Therefore, how to develop a solution to improve the above-mentioned lacks and inconveniences is a significant issue of the relevant industry.

SUMMARY

In one embodiment of the disclosure, a receiving mechanism and a holder thereof are provided for solving the problems mentioned in the prior art.

According to one embodiments of the disclosure, the holder includes a bracket, a first side portion, two second side portions and a third side portion. The bracket includes a support arm and an elastic plate inclinedly connected to the support arm. The first side portion is connected to one end of the support arm, and located at one side of the bracket. The second side portions are respectively connected to two opposite sides of the support arm, and collectively located at the side of the bracket. The third side portion is connected to one end of the elastic plate opposite to the support arm, and located at the same side of the bracket with the second side portions. When the elastic plate is pressed to be flush with the support arm, the bracket, the first side portion, the second side portions and the third side portion collectively form a holding space.

According to one or more embodiments of the disclosure, in this holder described above, the bracket further includes an extending rib connecting to one end of the third side portion being opposite to the elastic plate, and extending away from the elastic plate. The extending rib and the third side portion collectively define a depressed space.

According to one or more embodiments of the disclosure, in this holder described above, one end of each of the second side portions facing away from the first side portion is formed with a folding lug, and the folding lugs of the second side portions are respectively bent away from each other in opposite directions.

According to one or more embodiments of the disclosure, in this holder described above, the bracket further includes two auxiliary side portions respectively connected to two opposite sides of the elastic plate, and collectively located at the side of the bracket.

According to one or more embodiments of the disclosure, in this holder described above, the bracket further includes at least one hanging portion fixedly connected to another side of the bracket being opposite to the second side portions.

According to one or more embodiments of the disclosure, in this holder described above, one major axis direction of the support arm and one major axis direction of the elastic plate are intersected with each other so that a folding mark is formed between the elastic plate and the support arm. An included angle between the major axis direction of the support arm and the major axis direction of the elastic plate is an acute angle.

According to one or more embodiments of the disclosure, in this holder described above, the included angle between the major axis direction of the support arm and the major axis direction of the elastic plate is 6.5°-7°.

According to one or more embodiments of the disclosure, in this holder described above, the included angle between the major axis direction of the support arm and the major axis direction of the elastic plate is 3°-30°.

According to one or more embodiments of the disclosure, in this holder described above, the holder is a sheet metal member, and the bracket, the first side portion, the second side portions and the third side portion collectively are integrally formed.

According to one or more embodiments of the disclosure, in this holder described above, the bracket further includes at least one protrusion that is protrusively formed on the side of the bracket.

In one embodiment of the disclosure, a receiving mechanism is provided. The receiving mechanism includes a chassis, a cover panel and the holder described above. The chassis includes a first partition plate and a second partition plate disposed aside the first partition plate in which a receiving recess for receiving a loaded object is formed between the first partition plate and the second partition plate. The holder is received in the receiving recess in which the support arm is slidably connected to the second partition plate, one end of the elastic plate being opposite to the support arm is abutted against to the second partition plate, and is pressed to be temporarily deformed by the second partition plate, such that at least one portion of the loaded object is able to be restrained in the holding space, and one end of the bracket being opposite to the support arm is provided with a pivotal portion. The cover panel is disposed on one side of the chassis, and pivotally connected to the pivotal portion for selectively covering the receiving recess. When the holder is partially drawn outwards from the receiving recess, the elastic plate extends outwards from the receiving recess to rebound to move the cover panel and the elastic plate in a direction facing away from the side of the bracket.

According to one or more embodiments of the disclosure, in this receiving mechanism described above, when the holder is partially drawn outwards from the receiving recess, a folding mark is formed between the elastic plate and the support arm, and is located within the receiving recess. The elastic plate extending outwards from the receiving recess is pressed by the second partition.

According to one or more embodiments of the disclosure, in this receiving mechanism described above, the second partition plate includes a plate body and a position-limited portion. The plate body includes a linear opening in which one major axis direction of the linear opening is parallel to one major axis direction of the support arm, and the bracket is slidably limited within the receiving recess. The position-limited portion is disposed at a position of the plate body facing towards the linear opening, and used to limit the extent of the holder extending outwards from the receiving recess, and to hold the folding mark within the receiving recess.

According to one or more embodiments of the disclosure, in this receiving mechanism described above, the holder further includes an extending rib. The extending rib is connected to one end of the third side portion being opposite to the elastic plate, and extends away from the elastic plate. The pivotal portion is disposed on the extending rib, and a depressed space is collectively defined by the extending rib and the third side portion. When the elastic plate extending outwards from the receiving recess is moved to the cover panel, the depressed space is capable of accommodating a part of the cover panel.

According to one or more embodiments of the disclosure, in this receiving mechanism described above, when the cover panel covers the receiving recess, the third side portion and an inner surface of the cover panel facing towards the receiving recess are in contact with the loaded object, respectively.

According to one or more embodiments of the disclosure, in this receiving mechanism described above, a sunken space connected to the holder is concavely formed on the inner surface of the cover panel.

According to one or more embodiments of the disclosure, in this receiving mechanism described above, when the portion of the loaded object is restrained in the holding space, the bracket, the first side portion, the second side portions and the third side portion are in contact with different sides of the loaded object, respectively.

According to one or more embodiments of the disclosure, in this receiving mechanism described above, the first partition plate includes a sliding rail portion. The sliding rail portion is located within the receiving recess, and disposed opposite to the holder. The loaded object is loaded by the sliding rail portion and the holder, respectively.

According to one or more embodiments of the disclosure, in this receiving mechanism described above, the loaded object is a dummy hard disk; or the loaded object is a naked hard disk worn without any protecting case; or the loaded object is a hard disk set including a naked hard disk and a protecting case which is worn on the naked hard disk.

According to one or more embodiments of the disclosure, the receiving mechanism described above further includes a torsion spring element. The torsion spring element is connected to the cover panel and the holder for elastically moving the cover panel away from the receiving recess.

Thus, in the construction of the embodiments above, when the user is desired to remove the loaded object from or insert the loaded object into the receiving recess, since the cover panel is moved away from the receiving recess with the rebound of the elastic plate, the cover panel will not interfere with the movement of the loaded object. Thus, the user removing the loaded object from the receiving recess or inserting the loaded object into the receiving recess will not be affected.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
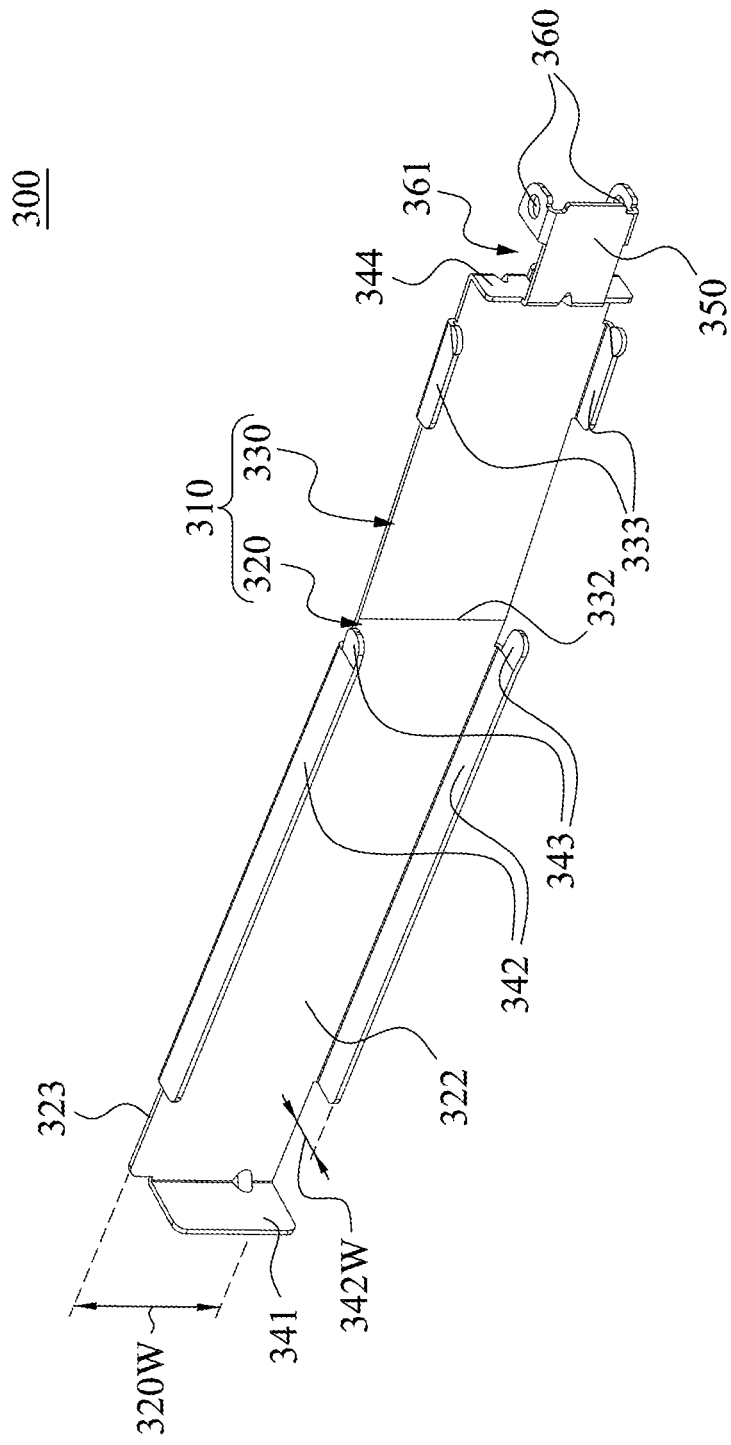
FIG. 1 is a perspective view of a holder according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
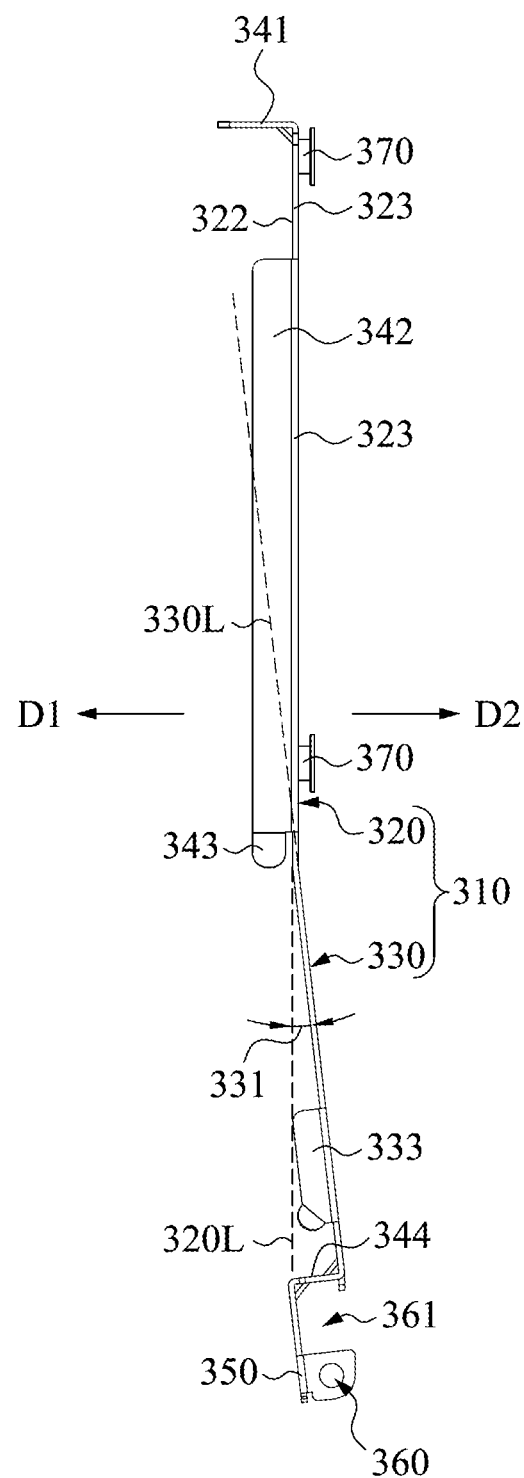
FIG. 2 is a side view of the holder of FIG. 1.

Reference is now made to FIG. 1 to FIG. 2, in which FIG. 1 is a perspective view of a holder 300 according to one embodiment of the disclosure, and FIG. 2 is a side view of the holder 300 of FIG. 1. As shown in FIG. 1 to FIG. 2, the holder 300 includes a bracket 310, a first side portion 341, two second side portions 342, a third side portion 344 and a pivotal portion 360. The bracket 310 includes a support arm 320 and an elastic plate 330 inclinedly connected to the support arm 320. The support arm 320 is provided with a front surface 322 and a rear surface 323 which are opposite to each other. In a natural state, the elastic plate 330 is bent with respect to the support arm 320, and the elastic plate 330 is bent towards a direction to which the rear surface 323 of the support arm 320 faces; that is, the elastic plate 330 is obliquely connected to one end of the support arm 320 so that a folding mark 332 is formed between the elastic plate 330 and the support arm 320.

In other words, the support arm 320 is provided with a first major axis direction 320L, that is, the support arm 320 extends along the first major axis direction 320L. The elastic plate 330 is provided with a second major axis direction 330L, that is, the elastic plate 330 extends along the second major axis direction 330L. The first major axis direction 320L and the second major axis direction 330L are intersected with each other. An included angle 331 formed between the first major axis direction 320L of the support arm 320 and the second major axis direction 330L of the elastic plate 330 is an acute angle, and the included angle 331 is, for example, 6.5° to 7°. However, as long as the included angle 331 formed between the first major axis direction 320L and the second major axis direction 330L is an acute angle, the disclosure is not limited to the size of the included angle 331.

Also, the first side portion 341 is connected to one end of the support arm 320 opposite to the elastic plate 330. The second side portions 342 are respectively connected to the support arm 320. The third side portion 344 is connected to one end of the elastic plate 330 opposite to the support arm 320. The first side portion 341, the second side portions 342 and the third side portion 344 are commonly disposed on one side of the bracket 310, that is, the first side portion 341, the second side portions 342 and the third side portion 344 extend towards a direction to which the front surface 322 of the support arm 320 faces. The pivotal portion 360 is disposed on one distal end of the bracket 310 opposite to the support arm 320.

More specifically, the bracket 310 further includes an extending rib 350. The extending rib 350 is connected to one end of the third side portion 344 being opposite to the elastic plate 330, and the extending rib 350 extends towards a direction facing away from the elastic plate 330 (refer to the second major axis direction 330L). The pivotal portion 360 is disposed on the extending rib 350, and the extending rib 350 and the third side portion 344 collectively define a depressed space 361. However, the disclosure is not limited thereto, and in other embodiments, the disclosure may also omit the existence of the extending rib and the depressed space.

The holder 300 further includes a plurality of hanging portions 370. The hanging portions 370 are fixedly connected to the other side of the bracket 310, that is, each of the hanging portions 370 extends towards a direction to which the rear surface 323 of the support arm 320 faces. More particularly, the hanging portions 370 are separately arranged on the rear surface 323 of the support arm 320, and are fixedly connected to the support arm 320. The hanging portions 370, for example, are studs, respectively. However, the disclosure is not limited thereto.

It is noted, in the embodiment, the direction of the one side of the bracket 310 is indicated to a direction to which the front surface 322 of the support arm 320 faces (e.g., the direction D1 in FIG. 2), and the direction of the other side of the bracket 310 is indicated to a direction to which the rear surface 323 of the support arm 320 faces (e.g., the direction D2 in FIG. 2).

In the embodiment, the holder 300 is a sheet metal member. The support arm 320 is directly connected to the elastic plate 330, and the support arm 320 and the elastic plate 330 are integrally formed with each other. The first side portion 341, the second side portions 342 and the third side portion 344 are also integrally formed with the bracket 310. However, the disclosure is not limited to the material of the holder 300.

Figure 3:
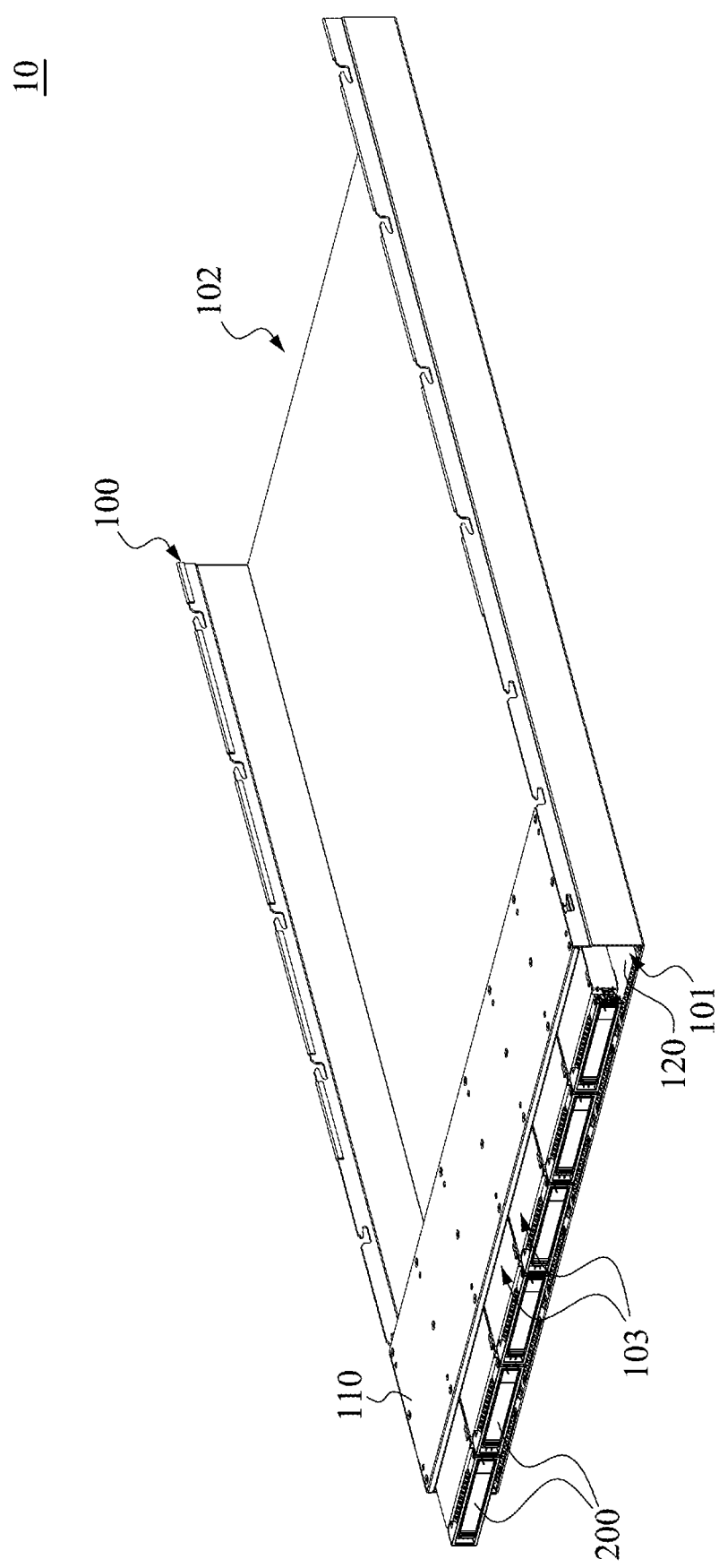
FIG. 3 is a perspective view of a receiving mechanism according to one embodiment of the disclosure.
Figure 4:
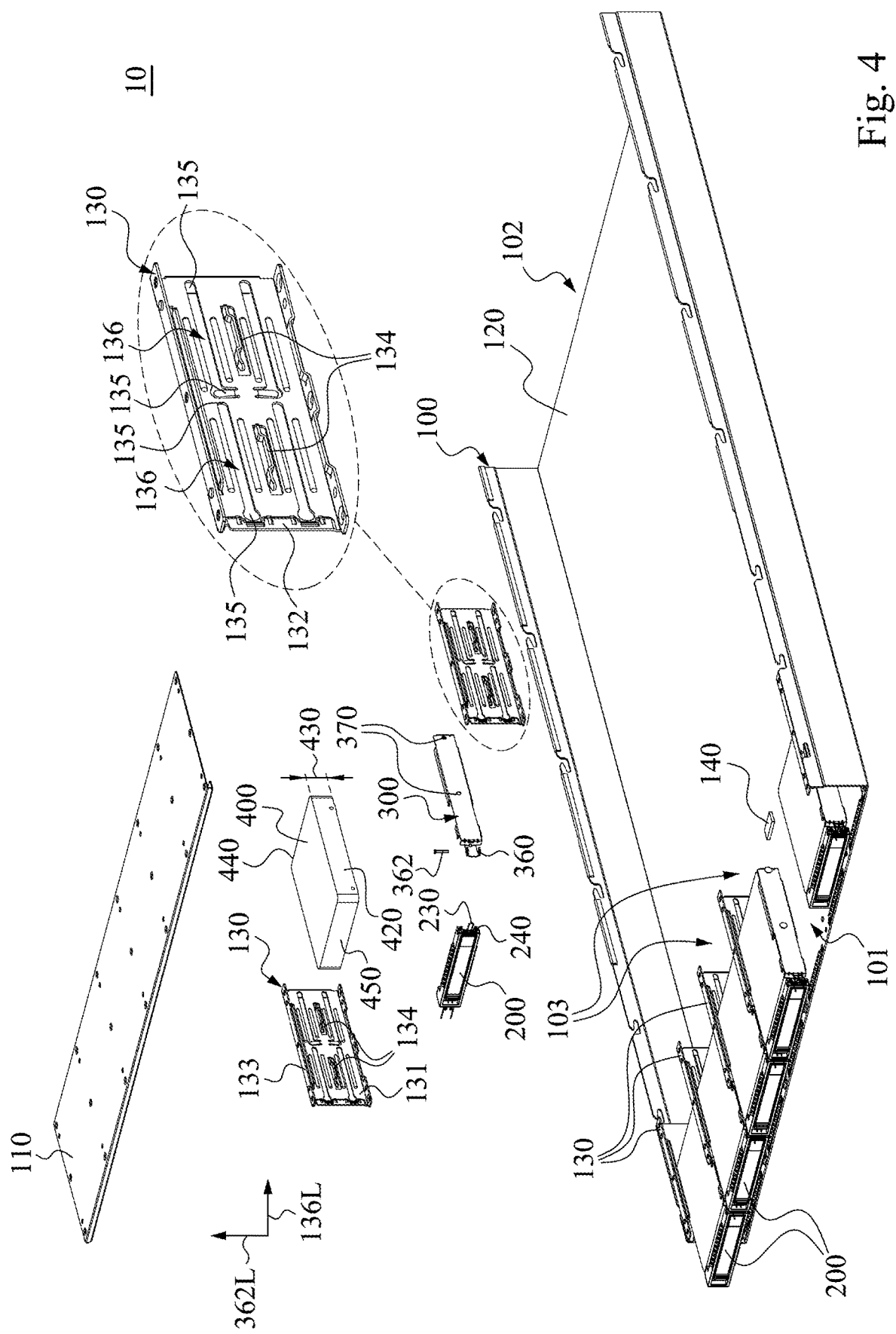
FIG. 4 is a partial exploded view of the receiving mechanism with an enlargement view of one of partition plates.

FIG. 3 is a perspective view of a receiving mechanism 10 according to one embodiment of the disclosure, and FIG. 4 is a partial exploded view of the receiving mechanism 10 with an enlargement view of one of partition plates 130. As shown in FIG. 3 and FIG. 4, the receiving mechanism 10 includes a chassis 100, a plurality of (e.g., 6) cover panels 200 and a plurality of (e.g., 6) holders 300 described above. The chassis 100 is formed with a front side 101 and a second side 102 which are opposite to each other. The front side 101 of the chassis 100 is formed with a plurality of receiving recesses 103 sequentially arranged in a uniserial direction. Each of the receiving recesses 103 can receive at least one loaded object 400, or more loaded objects 400 which are stacked one another. However, the disclosure is not limited thereto. For example, the chassis 100 is a server rack in which a server computer and related electronic components thereof can be placed. However, the disclosure is not limited to types of the chassis.

Specifically, the chassis 100 includes a top plate 110, a bottom plate 120 and a plurality of partition plates 130. The top plate 110 and the bottom plate 120 are arranged oppositely, and the partition plates 130 are located between the top plate 110 and the bottom plate 120. The partition plates 130 are arranged uprightly on the bottom plate 120 at interval, and located at the front side 101 of the chassis 100. For example, the partition plates 130 are sequentially arranged on the bottom plate 120 in a uniserial direction. One of the receiving recesses 103 is formed between any two adjacent partition plates 130. In the embodiment, any two adjacent partition plates 130 respectively have a first inner side 131 and a second inner side 132 which are faced to each other. Each of the partition plates 130 includes a plate body 133, a plurality of (e.g., two) sliding rail portions 134 and two position-limited portions 135 which are arranged oppositely. The sliding rail portions 134 are disposed on the plate body 133, and separately arranged on the first inner side 131 of the partition plate 130. The plate body 133 is formed with a linear opening 136. One major axis direction 136L of the linear opening 136 is parallel to the first major axis direction 320L (FIG. 2) of the support arm 320. The linear opening 136 is located between the position-limited portions 135, and each of the position-limited portions 135 is an inner edge of the plate body 133 facing towards the linear opening 136.

The holders 300 are received within the receiving recesses 103, respectively. Each holder 300 is disposed opposite to the sliding rail portion 134 in the same receiving recess 103, that is, the holder 300 is located on the second inner side 132 of the two adjacent partition plates 130 mentioned above. For example, as shown in FIG. 2 and FIG. 4, as the hanging portions 370 is slidably restrained in the linear opening 136, the holder 300 is slidably connected to the second inner side 132 of the two adjacent partition plates 130 so that the holder 300 can be reciprocatedly slid within the linear opening 136 along the major axis direction 136L of the linear opening 136. Since one of the position-limited portions 135 being closer to the front side 101 of the chassis 100 can restrict the holder 300 from leaving the receiving recess 103 from the chassis 100, the extent of the holder 300 being drawn out of the receiving recess 103 can be limited.

The cover panels 200 are disposed on one side of the bottom plate 120. The pivotal portion 240 of each of the cover panels 200 is pivotally connected to the pivotal portion 360 of one of the holders 300 with one pivotal shaft 362 so that each of the cover panels 200 can be rotated relative to the holder 300 about one major axis direction 362L of the pivotal shaft 362. Thus, each of the cover panels 200 can be rotated to cover the corresponding receiving recess 103 and removably fastened to the chassis 100, or rotated away from the chassis 100 to expose the corresponding receiving recess 103. Specifically, in the embodiment, each of the cover panels 200 further includes a torsion spring element 230. The torsion spring element 230 is connected to each of the cover panels 200 and one of the holders 300 so that the cover panel 200 can be pulled back to the original position. For example, the rebounding torsion spring element 230 moves the cover panels 200 away from the front side 101 of the chassis 100 to expose the corresponding receiving recess 103.

Each of the loaded objects 400 mentioned above is, for example, a hard disk. The most common hard disk product can be a naked hard disk worn without any protecting case. A rear end 440 of each of the loaded objects 400 is provided with a connection terminal 410 (such as a toolless connection, FIG. 5A) for pluggably coupling to the connector 140 built inside the chassis 100. For example, the thickness 430 of the loaded object 400 is 15 mm. However, the disclosure is not limited thereto, and the thickness of the loaded object 400 may also be 7 mm.

Figure 5A:
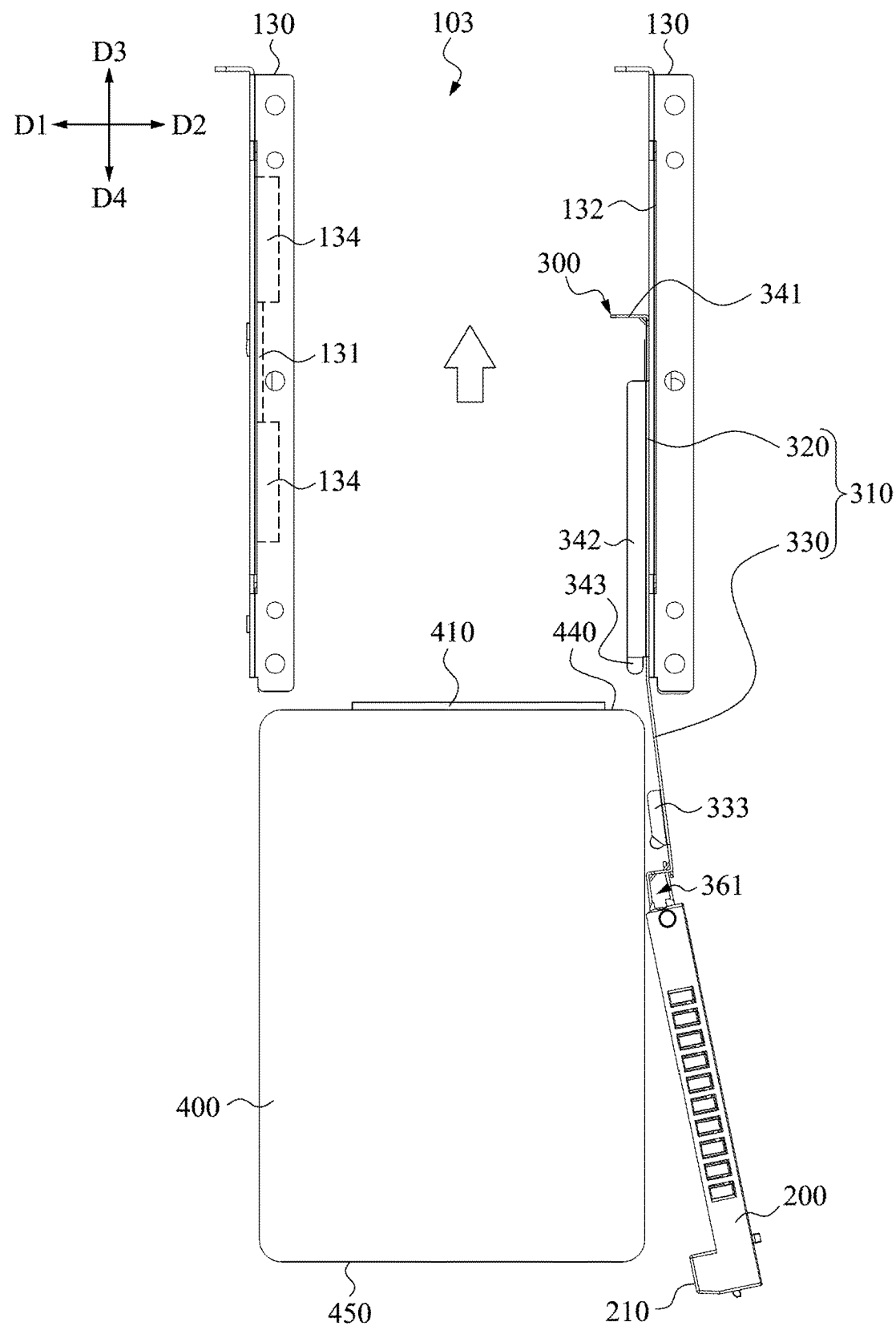
FIG. 5A-FIG. 5C are operational schematic views of the receiving mechanism of FIG. 3.
Figure 5B:
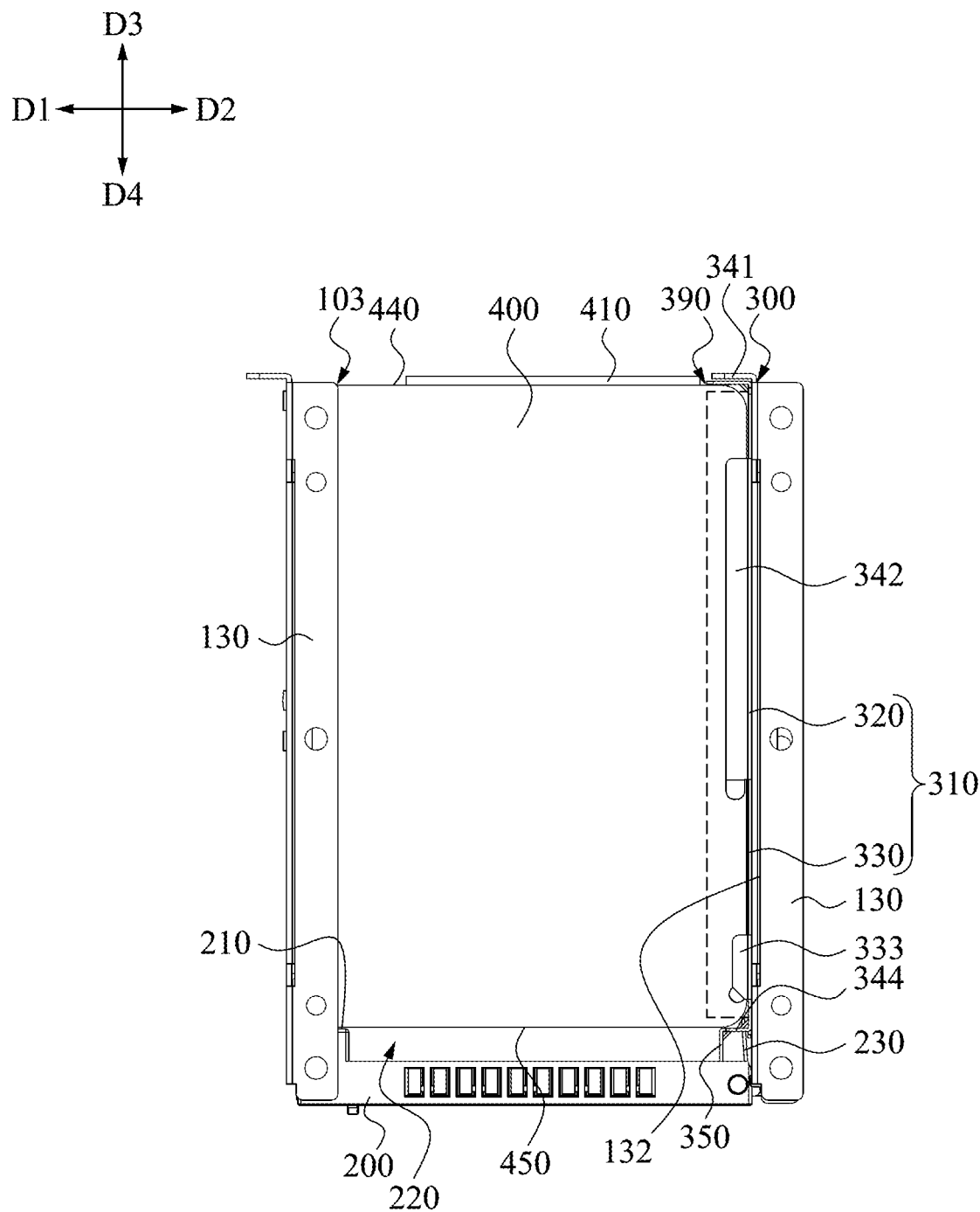
Figure 5C:
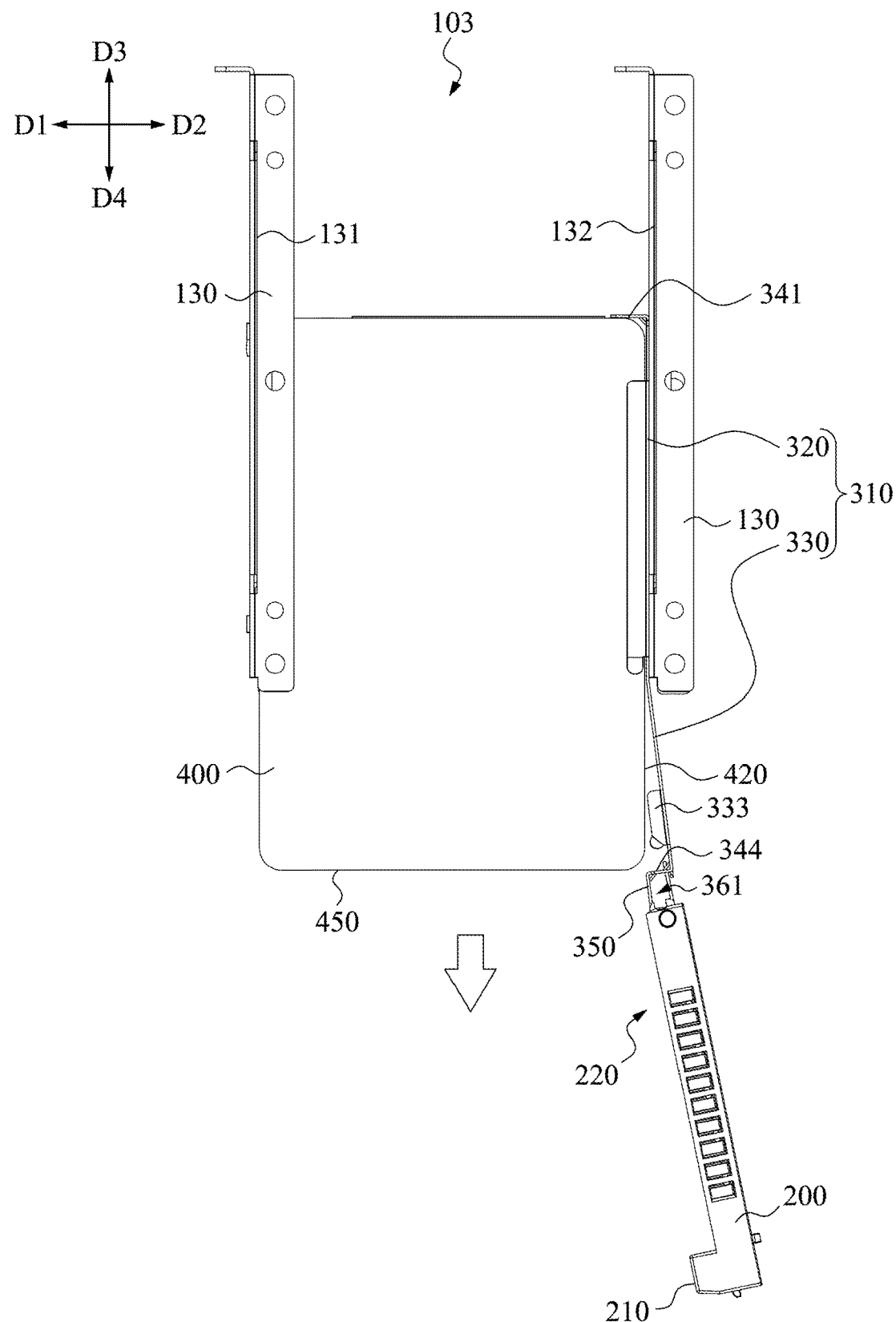

FIG. 5A-FIG. 5C are operational schematic views of the receiving mechanism 10 of FIG. 3. In the FIG. 5A, the loaded object 400 has not been placed in the receiving recess 103, the cover panel 200 has not covered the receiving recess 103 yet, and the holder 300 in the receiving recess 103 is in the natural state, that is, the elastic plate 330 of the bracket 310 has not been compressed to be connected obliquely.

Therefore, as shown in FIG. 5A and FIG. 5B, when a user would like to put an loaded object 400 into the receiving recess 103 in the direction D3 (FIG. 5A), the loaded object 400 is simultaneously placed on the sliding rail portions 134 and the holder 300. A part of the loaded object 400 is slidably disposed on the sliding rail portions 134, and another part of the loaded object 400 is moved to contact with the first side portion 341 between the second side portions 342 (FIG. 1) so as to move the holder 300 related to the second inner side 132. Specifically, as shown FIG. 5A to FIG. 5B, when the rear end 440 of the loaded object 400 pushes the first side portion 341 of the holder 300 towards the direction D3, the holder 300 is moved collectively by the loaded object 400.

In addition, when the bracket 310 is moved into the receiving recess 103, the elastic plate 330 of the holder 300 is pressed by the second inner side 132 of the partition plate 130 to be gradually flush with the support arm 320, thereby allowing the bracket 310, the first side portion 341, the second side portions 342 and the third side portion 344 collectively form a holding space 390. At this moment, the major axis direction of the elastic plate 330 and the major axis direction of the support arm 320 are substantially the same (refer to the directions D3, D4).

Because one end of the elastic plate 330 being opposite to the support arm 320 abuts against the second inner side 132 of the partition plate 130, and the end of the elastic plate 330 is temporarily deformed by the compression of the second inner side 132, thus, at least one part of the loaded object 400 can extend into the holding space to be restrained in the holding space. It is noted, the loaded object 400 is sandwiched between the first side portion 341 and the third side portion 344 of the holder 300, and sandwiched between the second side portions 342, so that the loaded object 400 is fit to be matchingly secured in the holding space 390. At this moment, the bracket 310, the first side portion 341, the second side portion 342, and the third side portion 344 of the holder 300 directly contact different sides of the loaded object 400.

In the embodiment, as shown in FIG. 1 and FIG. 4, the width 320W of the support arm 320 is substantially equal to a thickness 430 of the loaded object 400 (such as a naked hard disk) in which the width 342W of the second side portion 342 is smaller than the width 320W of the bracket 310 (e.g., the front surface 322), and the widths 342W of the second side portions 342 are substantially the same. However, the disclosure is not limited thereto. In other embodiments, these second side portions 342 may be different in width, for example, a width of a lower one of these second side portions 342 for supporting the loaded object 400 is greater than a width of the other second side portion 342.

Specifically, back to FIG. 1, in the embodiment, in each of the holders 300, one end of each of the second side portions 342 facing away from the first side portion 341 is formed with a folding lug 343. The folding lugs 343 of the second side portions 342 are respectively bent away from each other in opposite directions. Thus, in FIG. 5A, when the loaded object 400 is going to move into a space between the second side portions 342, the folding lugs 343 can assist the loaded object 400 to be guided into the space between the second side portions 342.

Furthermore, back to FIG. 1, the bracket 310 further includes two auxiliary side portions 333. The auxiliary side portions 333 are respectively connected to two opposite sides of the elastic plate 330, and both projected towards the same side of the bracket 310 (e.g. direction D1, FIG. 2). Thus, when the holder 300 is compressed so as to define the aforementioned holding space 390, since the loaded object 400 also located between the auxiliary side portions 333, the securing strength of the holder 300 to the loaded object 400 also can be increased.

Also, when the cover panel 200 covers the receiving recess 103, the inner surface 210 of the cover panel 200 which faces towards the receiving recess 103 and the third side portion 344 of the holder 300 collectively press against the front end 450 of the loaded object 400 in the receiving recess 103. Therefore, the possibilities of the loaded object 400 being swayed in the receiving recess 103 can be reduced. In addition, when the loaded object 400 is a naked hard disk or a hard disk set, the inner surface 210 of the cover panel 200 and the third side portion 344 of the holder 300 collectively press against the front end 450 of the loaded object 400 to stabilize the connection terminal 410 of the loaded object 400 electrically plugged the connector 140 of the chassis 100 so as to maintain better transmission quality.

As shown FIG. 5B and FIG. 5C, in FIG. 5B, the loaded object 400 is fixedly held in the holding space 390 of the holder 300, and completely received in the receiving recess 103. At this moment, the connection terminal 410 of the loaded object 400 is plugged into the connector 140 in the receiving recess 103 (FIG. 4). In FIG. 5C, when the user would like to remove the loaded object 400 away from the receiving recess 103 in a direction D4, the user first opens the cover panel 200 to expose the receiving recess 103. Next, a part of the elastic plate 330 is pulled outwards from the receiving recess 103. At this moment, since the second inner side 132 cannot completely press the elastic plate 330 anymore, the elastic plate 330 rebounds in the direction D2, thereby moving the third side portion 344 of the holder 300 and the cover panel 200 in the direction D2.

More specifically, when the third side portion 344 of the holder 300 is also moved away from the loaded object 400 toward the direction D2, and no longer abuts against the front end 450 of the loaded object 400, the holder 300 no longer holds the loaded object 400. Thus, the third side portion 344 will not interfere with the route of the loaded object 400 moving out of the holder 300. In addition, since the cover panel 200 is also moved away from the traveling path that the loaded object 400 moves out of the holder 300, the cover panel 200 will not hinder the loaded object 400 taken out from or pushed into the receiving recess 103 by the user.

It is noted, the disclosure is not limited that the resilience of the elastic plate 330 is only capable of driving the third side portion 344 and the cover panel 200 away from the receiving recess 103. In other embodiment, one with ordinary skill in the art of the disclosure may appropriately adjust the resilience of the elastic plate in accordance with the demanding or limitation such that the resilience is great enough for pushing the loaded object 400 in the receiving recess 103.

As shown in FIG. 5C, by selection of the position-limited portions 135 described above in the disclosure, the extent of the holder 300 being drawn out of the receiving recess 103 can be limited. More particularly, the folding mark 332 is located within the receiving recess 103 so that the elastic plate 330 partially protruding from the receiving recess 103 is still pressed against the corresponding partition plate 130 by the corresponding partition plate 130.

Since the elastic plate 330 of the bracket 310 cannot be completely removed from the receiving recess 103, thus, the rebounding elastic plate 330 can be blocked by the corresponding partition plate 130, so as to avoid the cover panel 200 from being excessively swung to the corresponding partition plate 130 neighboring to the receiving recess 103 by the entire resilience of the elastic plate 330 to damage the cover panel 200, or to interfere with the usage of another neighboring loaded object 400.

As shown in FIG. 2 and FIG. 5C, since the extending rib 350 and the third side portion 344 collectively define the above-mentioned depressed space 361, when the cover panel 200 is brought to the partition plate 130 aside the receiving recess 103 by the elastic plate 330, the depressed space 361 can receive a part of the cover panel 200. Thus, once the depressed space 361 can receive the part of the cover panel 200, the cover panel 200 can be further away from the travelling path of the loaded object 400 reciprocating in the receiving recess 103, and will not hinder the loaded object 400 reciprocating in the receiving recess 103.

As shown in FIG. 5B, the inner surface 210 of the cover panel 200 is further concavely formed with a sunken space 220. The sunken space 220 is directly connected to the extending rib 350 of the holder 300. When the cover panel 200 covers the receiving recess 103, the sunken space 220 is in communication with the receiving recess 103. As shown in FIG. 5C, when the cover panel 200 is opened to expose the receiving recess 103, since the sunken space 220 of the cover panel 200 is overlapped with the travelling path of the loaded object 400 removing away from the receiving recess 103, the cover panel 200 will not hinder the loaded object 400 taken out from or pushed into the receiving recess 103 by the user.

Figure 6:
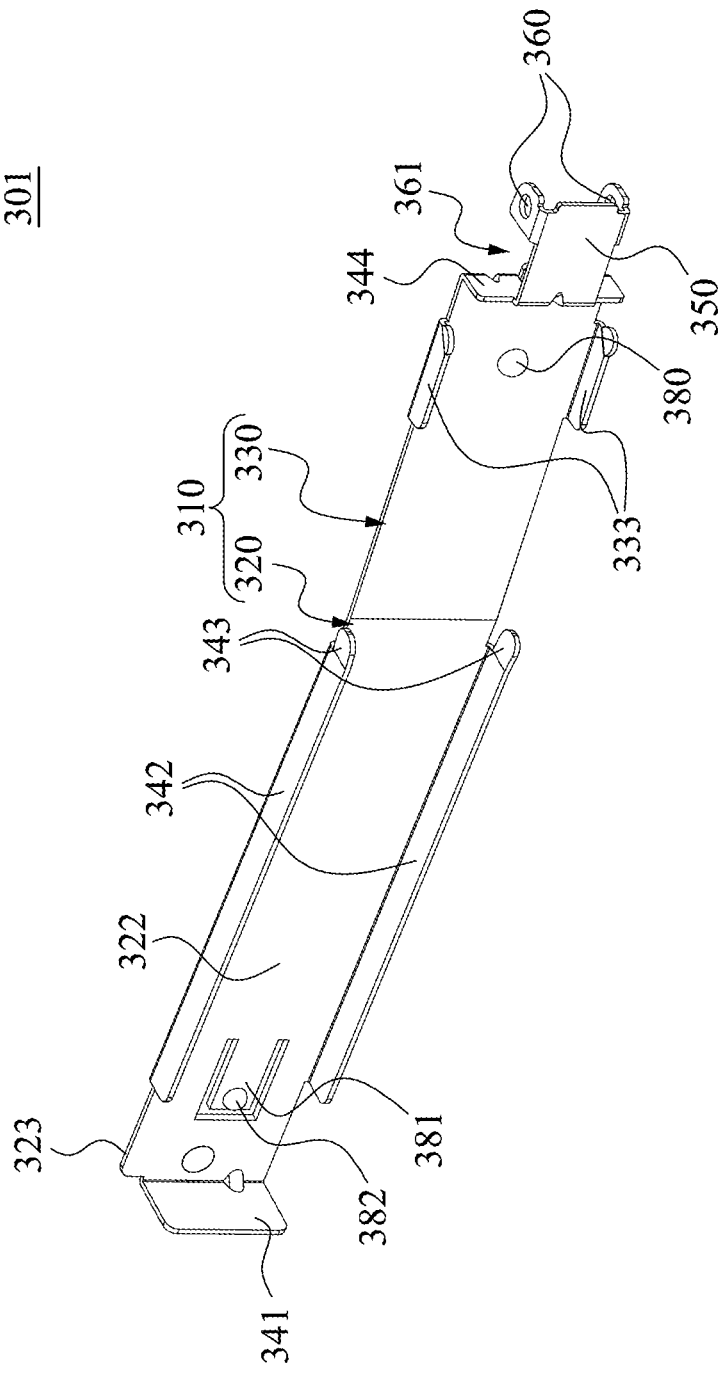
FIG. 6 is a perspective view of a holder according to another embodiment of the disclosure.

FIG. 6 is a perspective view of a holder 301 according to another embodiment of the disclosure. As shown in FIG. 6, the holder 301 of FIG. 6 is substantially the same to the holder 300 of FIG. 1, and one of the differences from the holder 300 of FIG. 1 is that the holder 301 further includes one or more protrusions. The protrusions are protrusively formed on the side of the holder 301 for contacting or pressing against one side of the bracket 310. These protrusions for example, respectively are a convex hull 380 and a bump 382 in which the convex hull 380 is stamped to be protrudingly formed on the elastic plate 330, and the bump 382 is concavely formed on an elastic arm 381 from the front surface 322 of the support arm 320. More specifically, the convex hull 380 and the bump 382 are sequentially arranged on one side of the bracket 310 in a single row.

Therefore, when the loaded object 400 is pushed into the receiving recess 103, the convex hull 380 and the bump 382 elastically press against the loaded object 400 to enhance the securing strength of the holder 301 to the loaded object 400. However, the disclosure is not limited thereto, and in other embodiments, the protrusions may be the same in form.

Figure 7A:
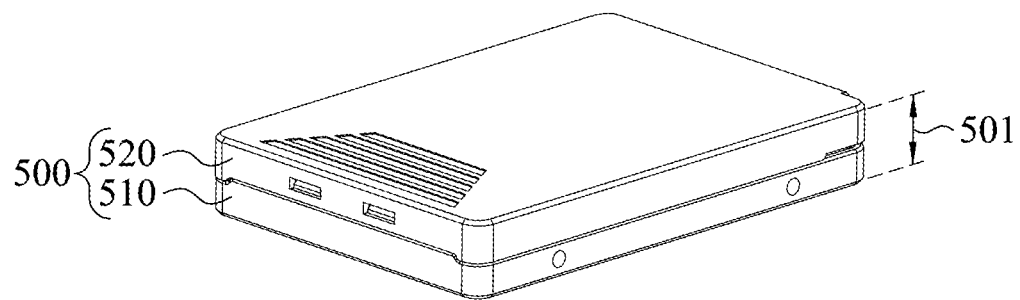
FIG. 7A-FIG. 7B are schematic views of the loaded object according to aforementioned embodiments of the disclosure.
Figure 7B:
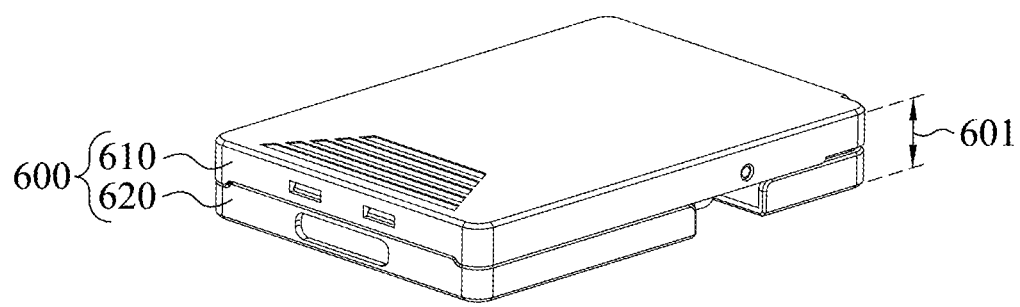

Although each of the loaded objects 400 described in all of the above embodiments is a naked hard disk, however, the disclosure is not limited to that the loaded object 400 only can be the naked hard disk worn without any protecting case 520. FIG. 7A-FIG. 7B are schematic views of the loaded objects 401, 402 according to aforementioned embodiments of the disclosure. As shown in FIG. 7A, exemplarily, the loaded object 401 is a hard disk set 500. The hard disk set 500 includes a naked hard disk 510 and a protecting case 520 which is worn on the naked hard disk 510. The protecting case 520 covers the top surface of the naked hard disk 510 for protecting the naked hard disk 510. For example, when the thickness of the naked hard disk 510 is 7 mm, the protecting case 520 is sleeved on the naked hard disk 510 to thicken the thickness 501 of the hard disk set 500 to 15 mm, thereby matchingly entering the holding space 390 to be directly sandwiched by the second side portions 342.

As shown in FIG. 7B, exemplarily, the loaded object 402 is a dummy hard disk 600 having no real hard disk therein. The dummy hard disk 600 includes an upper part 610 and a lower part 620 which are combined with each other. The upper part 610 can be a protecting case. The thickness 601 of the dummy hard disk 600 is used to be a hard disk for being received in the receiving mechanism, so that the receiving recess in the receiving mechanism will not be vacant. However, the disclosure is not limited to the dummy hard disk only.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A holder, comprising: a bracket comprising a support arm and an elastic plate inclinedly connected to the support arm; a first side portion connected to one end of the support arm, and extending in a first direction to be located at one side of the bracket; two second side portions respectively connected to two opposite sides of the support arm, and extending in the first direction to be collectively located at the one side of the bracket; a third side portion connected to one end of the elastic plate opposite to the support arm, wherein, when the elastic plate is pressed to be flush with the support arm, the bracket, the first side portion, the two second side portions and the third side portion collectively form a holding space, and the third side portion extends towards the holding space to be located at the same side of the bracket with the two second side portions; an extending rib connected to one end of the third side portion being opposite to the elastic plate, and extending away from the elastic plate, such that the third side portion is connected between the extending rib and the elastic plate, and the extending rib is closer to the holding space than the elastic plate; and a pivotal portion disposed on one end of the extending rib opposite to the support arm such that the extending rib is connected between the pivotal portion and the third side portion, and the pivotal portion extending in a second direction that is opposite to the first direction such that the third side portion, the extending rib and the pivotal portion collectively define a depressed space.

2. The holder of claim 1, wherein one end of each of the two second side portions facing away from the first side portion is formed with a folding lug, and the folding lugs of the two second side portions are respectively bent away from each other in opposite directions.

3. The holder of claim 1, wherein the bracket further comprises:
two auxiliary side portions respectively connected to two opposite sides of the elastic plate, and collectively located at the side of the bracket.

4. The holder of claim 1, wherein the bracket further comprises:
at least one hanging portion fixedly connected to another side of the bracket being opposite to the two second side portions.

5. The holder of claim 1, wherein one major axis direction of the support arm and one major axis direction of the elastic plate are intersected with each other so that a folding mark is formed between the elastic plate and the support arm, and an included angle between the major axis direction of the support arm and the major axis direction of the elastic plate is an acute angle.

6. The holder of claim 5, wherein the included angle between the major axis direction of the support arm and the major axis direction of the elastic plate is 6.5°-7°.

7. The holder of claim 5, wherein the included angle between the major axis direction of the support arm and the major axis direction of the elastic plate is 3°-30°.

8. The holder of claim 1, wherein the holder is a sheet metal member, and the bracket, the first side portion, the two second side portions and the third side portion collectively are integrally formed.

9. The holder of claim 1, wherein the bracket further comprises at least one protrusion that is protrusively formed on the side of the bracket.

10. A receiving mechanism, comprising:
a chassis comprising:
a first partition plate; and
a second partition plate disposed aside the first partition plate, wherein a receiving recess for receiving a loaded object is formed between the first partition plate and the second partition plate;
a holder of claim 1 received in the receiving recess, wherein the support arm is slidably connected to the second partition plate, one end of the elastic plate being opposite to the support arm is abutted against to the second partition plate, and is pressed to be temporarily deformed by the second partition plate, such that at least one portion of the loaded object is able to be restrained in the holding space; and
a cover panel disposed on one side of the chassis, and pivotally connected to the pivotal portion for selectively covering the receiving recess,
wherein, when the holder is partially drawn outwards from the receiving recess, the elastic plate extends outwards from the receiving recess to rebound to move the cover panel and the elastic plate in a direction facing away from the side of the bracket,
when the cover panel is brought to the first partition plate aside the receiving recess by the elastic plate, a part of the cover panel is received in the depressed space.

11. The receiving mechanism of claim 10, wherein when the holder is partially drawn outwards from the receiving recess, a folding mark is formed between the elastic plate and the support arm, and is located within the receiving recess, so that the elastic plate extending outwards from the receiving recess is pressed by the second partition.

12. The receiving mechanism of claim 11, wherein the second partition plate comprises:
a plate body comprising a linear opening in which one major axis direction of the linear opening is parallel to one major axis direction of the support arm, and the bracket is slidably limited within the receiving recess; and
a position-limited portion disposed at a position of the plate body facing towards the linear opening, and configured to limit the extent of the holder extending outwards from the receiving recess, and hold the folding mark within the receiving recess.

13. The receiving mechanism of claim 10, wherein, when the cover panel covers the receiving recess, the third side portion and an inner surface of the cover panel facing towards the receiving recess are in contact with the loaded object, respectively.

14. The receiving mechanism of claim 13, wherein a sunken space connected to the holder is concavely formed on the inner surface of the cover panel.

15. The receiving mechanism of claim 10, wherein, when the at least one portion of the loaded object is restrained in the holding space, the bracket, the first side portion, the two second side portions and the third side portion are in contact with different sides of the loaded object, respectively.

16. The receiving mechanism of claim 10, wherein the first partition plate comprises a sliding rail portion, the sliding rail portion is located within the receiving recess, and disposed opposite to the holder,
wherein the loaded object is loaded by the sliding rail portion and the holder, respectively.

17. The receiving mechanism of claim 10, wherein the loaded object is a dummy hard disk; or
the loaded object is a naked hard disk worn without any protecting case; or
the loaded object is a hard disk set comprising a naked hard disk and a protecting case which is worn on the naked hard disk.

18. The receiving mechanism of claim 10, further comprise:
a torsion spring element connected to the cover panel and the holder for elastically moving the cover panel away from the receiving recess.

* * * * *